(12) United States Patent
Pawloski

(10) Patent No.: US 11,773,946 B2
(45) Date of Patent: Oct. 3, 2023

(54) GEARLESS TRANSMISSION UNIT HAVING UNILATERALLY POSITIONED FINGER ASSISTS

(71) Applicant: John Pawloski, West Islip, NY (US)

(72) Inventor: John Pawloski, West Islip, NY (US)

( * ) Notice: Subject to any disclaimer, the term of this patent is extended or adjusted under 35 U.S.C. 154(b) by 0 days.

(21) Appl. No.: 17/442,457

(22) PCT Filed: Mar. 31, 2020

(86) PCT No.: PCT/US2020/025885
§ 371 (c)(1),
(2) Date: Sep. 23, 2021

(87) PCT Pub. No.: WO2020/205819
PCT Pub. Date: Oct. 8, 2020

(65) Prior Publication Data
US 2022/0163098 A1 May 26, 2022

Related U.S. Application Data

(60) Provisional application No. 62/827,458, filed on Apr. 1, 2019.

(51) Int. Cl.
*F16H 13/08* (2006.01)
(52) U.S. Cl.
CPC .................... *F16H 13/08* (2013.01)
(58) Field of Classification Search
CPC ........................................ F16H 13/08
See application file for complete search history.

(56) References Cited

U.S. PATENT DOCUMENTS

| | | | |
|---|---|---|---|
| 2,727,396 | A | 12/1955 | Haugwitz |
| 4,832,630 | A | 5/1989 | Alexander, Jr. et al. |
| 6,241,636 | B1 | 6/2001 | Miller |
| 7,909,723 | B2 | 3/2011 | Triller et al. |
| 8,033,953 | B2 | 10/2011 | Pawloski |
| 9,845,848 | B2 | 12/2017 | Tanaka et al. |

(Continued)

FOREIGN PATENT DOCUMENTS

| | | |
|---|---|---|
| DE | 202006007765 U1 | 8/2006 |
| GB | 134027 A | 11/1919 |

OTHER PUBLICATIONS

International Preliminary Report on Patentability PCT/US20/25885 dated Oct. 14, 2021.

(Continued)

*Primary Examiner* — Derek D Knight
(74) *Attorney, Agent, or Firm* — George Likourezos; Jason B. Scher; Carter, DeLuca & Farrell LLP

(57) ABSTRACT

A transmission arrangement includes an input shaft, an output shaft, an outer race mounted on one end of one of the input and output shafts, an inner race mounted on one end of the other of the input and output shafts, ball bearings, and first and second finger assists. The inner and outer races are arranged to create a cage. The ball bearings are disposed within the cage and spaced apart from each other. The first finger assist is mounted to press at least a first one of the ball bearings into position within the cage. The second finger assist is mounted to press at least a second one of the ball bearings into position within the cage. The second finger assist is disposed in registration with the first finger assist.

15 Claims, 6 Drawing Sheets

(56) References Cited

Figure 1:
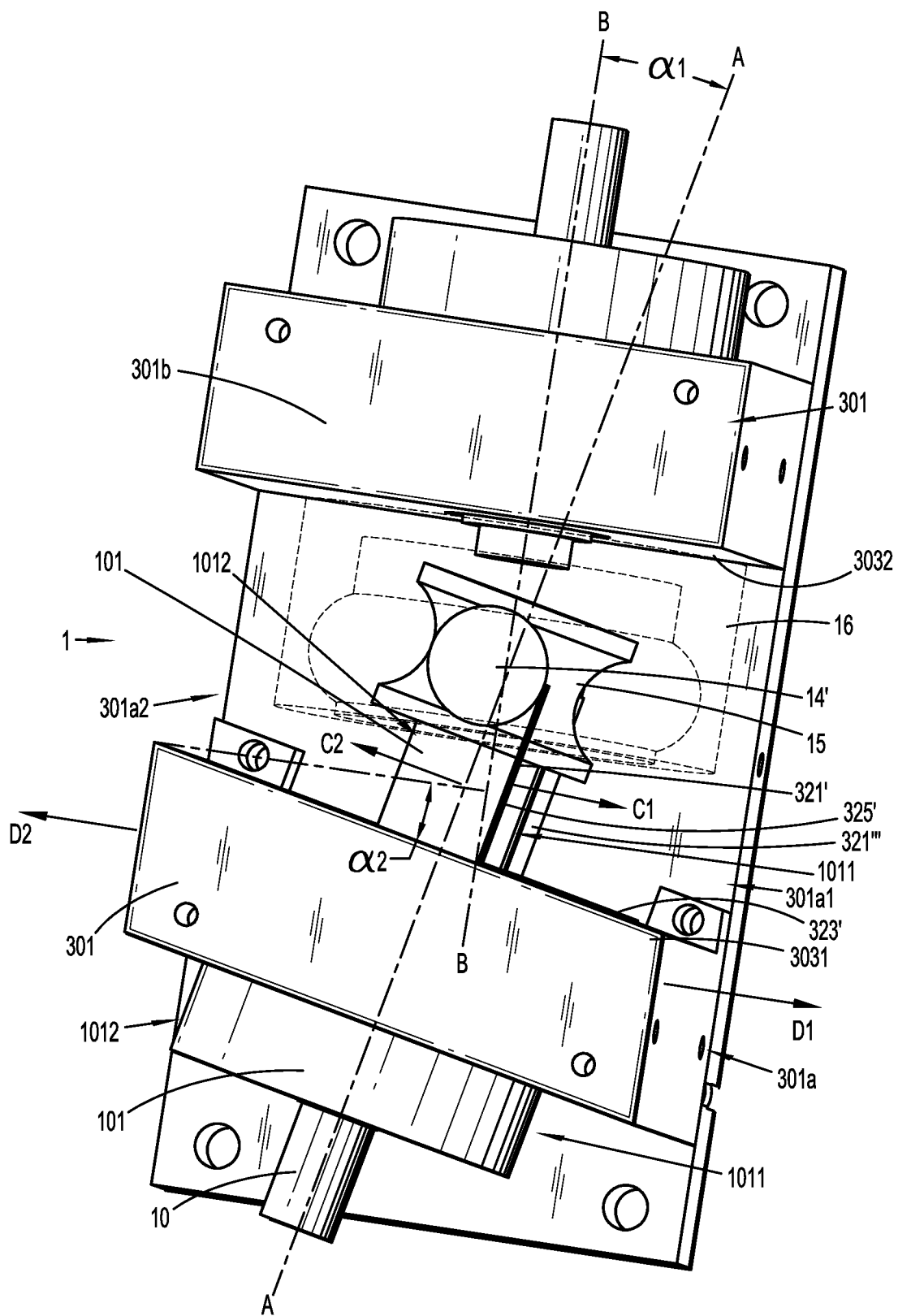

U.S. PATENT DOCUMENTS 10,018,255 B2 * 7/2018 Pawloski ............... F16H 13/08
2018/0313435 A1 * 11/2018 Pawloski ............... F16H 13/08

OTHER PUBLICATIONS

India Examination Report for application No. 202117043800 dated Mar. 9, 2022 with English translation.
International Search Report for application No. PCT/US20/25885 dated Jul. 22, 2020.
Written Opinion for application No. PCT/US20/25885 dated May 27, 2020.
Extended European Search Report issued by European Patent Office in connection with International Application No. 20783338.5, dated Oct. 21, 2022.
European Communication for application No. 20 783 338.5 dated May 31, 2023.

* cited by examiner

GEARLESS TRANSMISSION UNIT HAVING UNILATERALLY POSITIONED FINGER ASSISTS

CROSS-REFERENCE TO RELATED APPLICATIONS

This application claims the benefit of International Application No. PCT/US2020/025885 filed Mar. 31, 2020, which claims benefit to U.S. Provisional Application Ser. No. 62/827,458, filed on Apr. 1, 2019, the entire contents of which are incorporated by reference herein.

The present disclosure incorporates by reference, in their entirety, the contents of U.S. Pat. No. 8,033,953 B2, issued on Oct. 11, 2011 to J. Pawloski and U.S. Pat. No. 10,018,255 B2, issued on Jul. 10, 2018 to J. Pawloski, each entitled "GEARLESS SPEED REDUCER OR INCREASER."

BACKGROUND

In traditional devices used to increase or reduce speed, the connection between the input shaft and the output shaft is made through the use of gears. An internal gear on one shaft cooperates with an external gear on the other shaft to transmit the power from one shaft to the other. If the two shafts have different radii, the speed of one shaft will differ from that of the other shaft.

A problem with this arrangement, however, is that it is very difficult to create precisely machined gears that have no play between them. This play leads to inaccuracies in the machine in which the shafts are disposed. With operations that require very precise positioning, such as with jewelry making or circuit board operations, the traditional gear-based speed reducers are not optimal.

SUMMARY

This disclosure describes a gearless transmission unit having unilaterally positioned finger assists that establish contact points on the same side of ball bearings positioned in pockets between an inner race and an outer race. At first, one ball will engage, then, because of minor flexing within the shafts, housing and transmission unit as a whole, both balls will engage with the finger assists allowing proper rotation of both balls. Since the housing sections are rigidly mounted and the balls remain in the pockets even without the finger assists (or arm members) in position, the finger assists "push" the balls in reaction to the balls pushing up against the arm members due to their direction of rotation since the finger assists themselves do not move significantly. By both finger assists establishing contact points on the same side of the balls, the finger assists push unilaterally, e.g., from the same side of the balls, which allows for less strict tolerancing in terms of manufacturing. That is, the dimensions of the contact diameters of the races, their shape and profile, and the accuracy of the angle between the centerline of rotation of the output shaft with respect to the centerline of rotation of the input shaft need not be as precise as in prior designs because the finger assists push the balls into a proper position within the pockets despite less stringent dimensional tolerances in the effective formation of the pockets. Having the transmission arrangement capable of operating either in the clockwise (CW) or counterclockwise (CCW) direction depending upon the direction of rotation of the motor shaft significantly extends the suitability of applying the transmission arrangement to more applications, enabling energy efficiency improvements in more applications as compared to the prior bilateral transmission arrangement.

According to one aspect, this disclosure is directed to a transmission arrangement. The transmission arrangement includes an input shaft, an output shaft, an outer race mounted on one end of one of the input and output shafts, an inner race mounted on one end of the other of the input and output shafts, ball bearings, and first and second finger assists. The inner and outer races are arranged to create a cage. The ball bearings are disposed within the cage and spaced apart from each other. The first finger assist is mounted to press at least a first one of the ball bearings into position within the cage. The second finger assist is mounted to press at least a second one of the ball bearings into position within the cage. The second finger assist is disposed in registration with the first finger assist.

In aspects, one or both of the first or second finger assists may include a metallic material.

In aspects, the ball bearings may be prevented from sliding within the inner and outer races.

In aspects, the input shaft may rotate at a first speed and the output shaft may rotate at a second speed. Rotation of the input shaft may rotate the output shaft. The first and second speeds may be different.

In aspects, the input shaft and the output shaft may be rotatably mounted in a housing. The first and second finger assists may be fixedly mounted to the housing.

In aspects, the input shaft may define a first lateral side and a second lateral side. The first and second finger assists may be disposed on the first lateral side of the input shaft. The first finger assist may include a first projecting arm member that contacts the first ball bearing on the first lateral side of the input shaft and the second finger assist may include a second projecting arm member that contacts the second ball bearing on the first lateral side of the input shaft.

In aspects, the inner race may be disposed on the input shaft and the outer race may be disposed on the output shaft.

In aspects, the outer race may be disposed on the input shaft and the inner race may be disposed on the output shaft.

In aspects, the transmission arrangement may further include a motor connected to the input shaft and positioned to rotate the input shaft relative to the output shaft.

In aspects, the first and second finger assists may be disposed in vertical registration with one another.

In aspects, the inner and outer races may be disposed at an angle with respect to one another.

DETAILED DESCRIPTION

U.S. Pat. No. 8,033,953, the entire disclosure of which is herein incorporated by reference, provides a gearless speed reducer or increaser which solves these problems.

U.S. Pat. No. 10,018,255, the entire disclosure of which is herein incorporated by reference, provides gearless speed reducers or increasers that enable the achievement of very precise tolerances and which can be easily manufactured with few parts. In addition, U.S. Pat. No. 10,018,255 discloses that the shafts are supported in a housing, and finger assists are mounted in the housing so as to press the balls into place within the races on opposing sides. The finger assists are rigid projections that extend into the races and press the balls into the proper position. This allows the unit to function well, even if precise manufacturing tolerances are not achieved.

The input and output shafts are bilaterally positioned and thus enable operation in one direction, either clockwise (CW) or counter-clockwise (CCW), depending on the mounting position of the finger assists.

Figure 2:
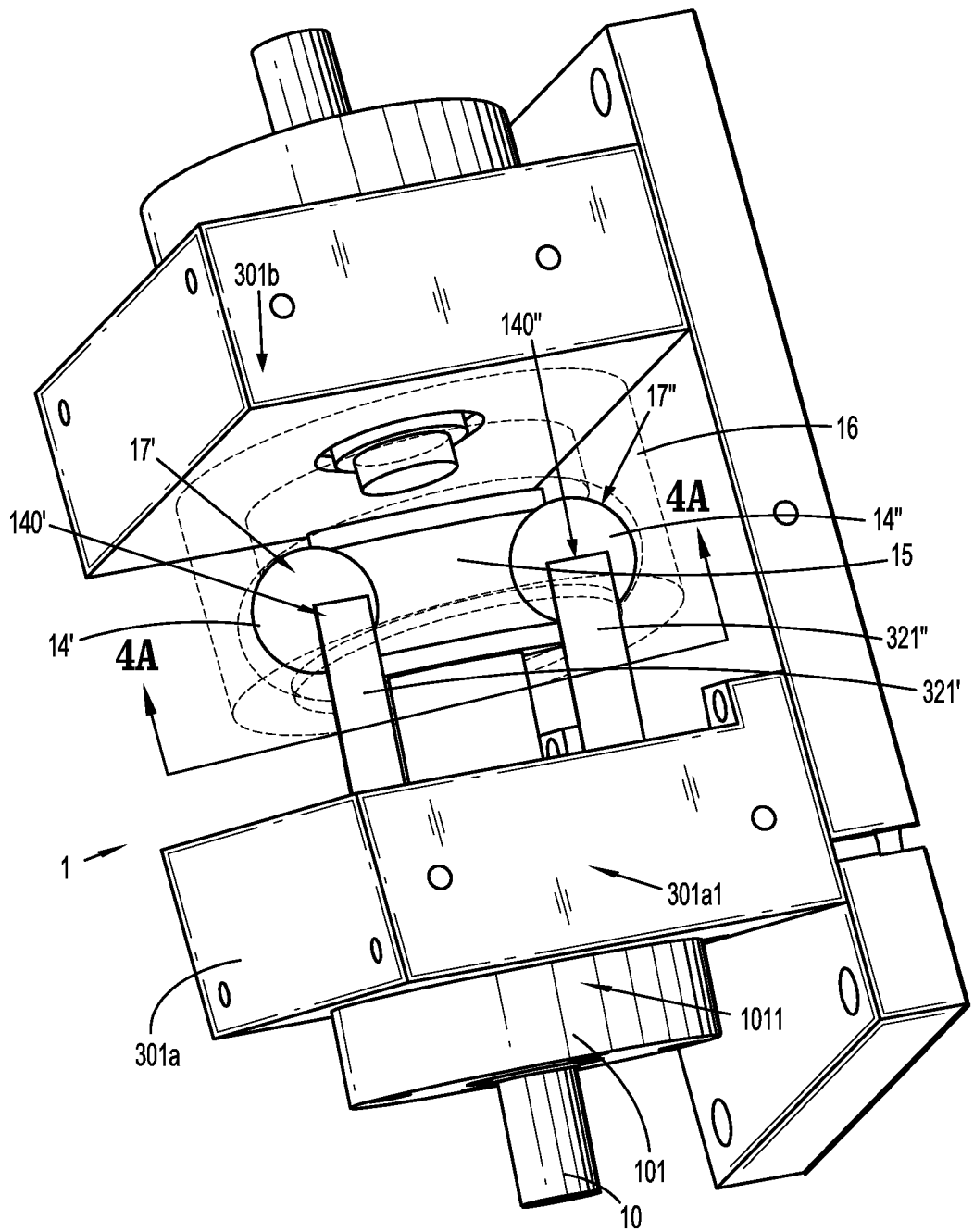
Figure 3:
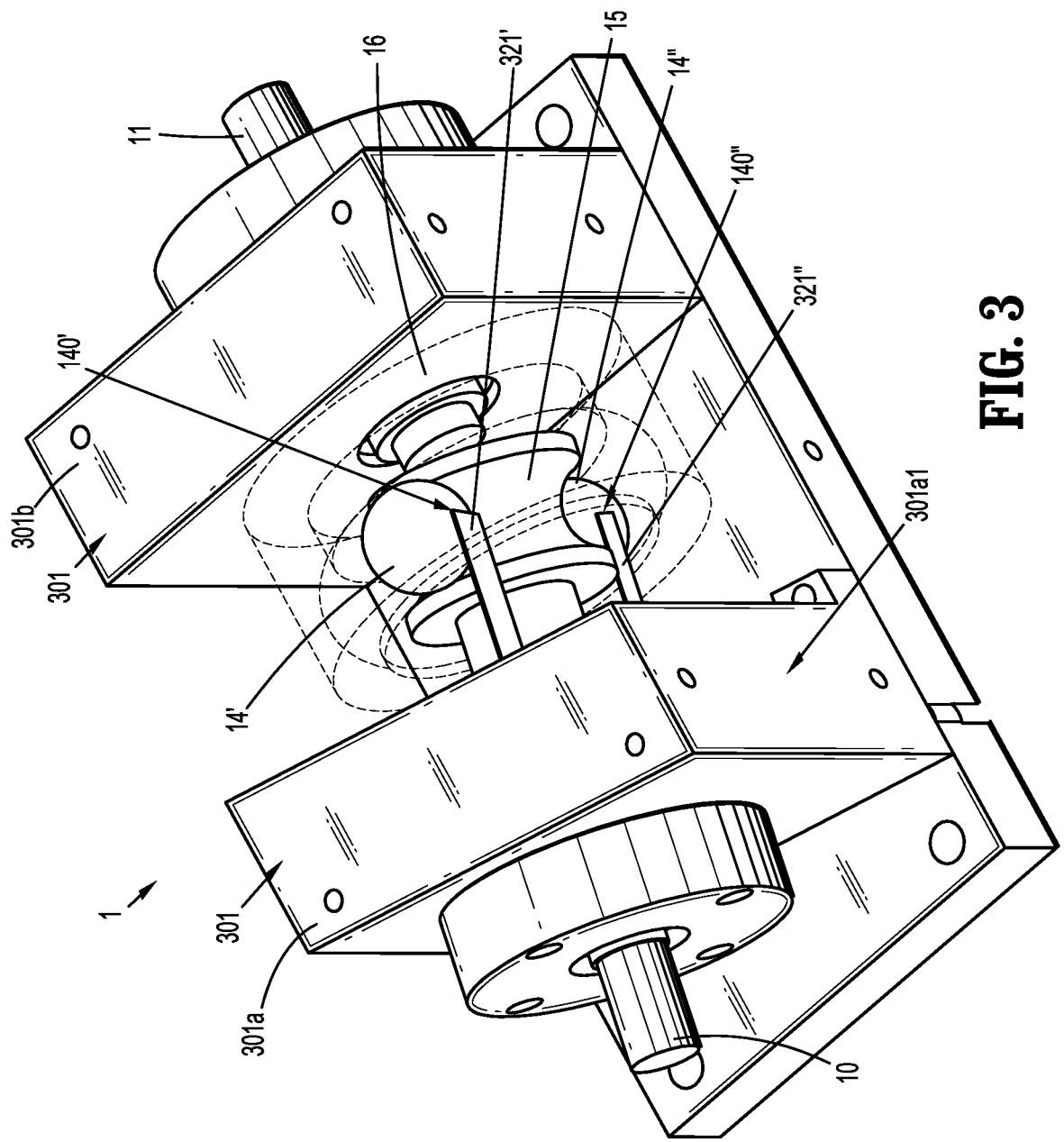

FIGS. 1-3 illustrate a transmission arrangement or unit 1 according to the present disclosure that provides further non-obvious and significant advantages with respect to the field of gearless speed reducers or increasers.

Transmission unit 1 includes an input shaft 10 and output shaft 11 that are rotatably mounted in a housing 301. The housing 301 is formed in a first section 301a and a second section 301b that are disposed at an angle with respect to one another to enable the output shaft 11 to be mounted in and supported by the second section 301b such that the centerline of rotation "B" of the output shaft 11 is positioned at an angle $\alpha 1$ with respect to the centerline of rotation "A" of the input shaft 10 which is mounted in and supported by the first section 301a.

As a result, inner surface 3031 of the first section 301a interfaces, at an angle $\alpha 2$, inner surface 3032 of the second section 301b, wherein $\alpha 1=\alpha 2$. An inner race 15 is connected to the input shaft 10 on a side of the first section 301a that extends from inner surface 3031. An outer race 16 extends from the inner surface 3032 of the second section 301b. The outer race 16 encompasses an internal volume with respect to the inner race 15 such that the inner race 15 is received within the internal volume wherein a first ball 14' is positioned on an upper region of the inner race 15 and a second ball 14" is positioned on a lower region of the inner race 15. The first ball 14' is positioned between an upper region of the interior surface of the outer race 16 and the upper region of the inner race 15 while the second ball 14" is positioned between a lower region of the interior surface of the outer race 16 and the lower region of the inner race 15 so that first and second balls 14' and 14" function as ball bearings.

The inner and outer races 15 and 16, respectively, are arranged concentrically and at the angle $\alpha 2$ with respect to one another to create a cage for the balls 14' and 14", wherein the at least two balls 14' and 14" are disposed within in pockets 17' and 17" of the cage and diametrically opposed (e.g., spaced 180 degrees apart from each other) such that the balls 14' and 14" are captured in the respective pockets 17' and 17" between the inner and outer races 15 and 16 and cannot slide within the inner and outer races 15 and 16. The balls 14' and 14" remain in the pockets 17' and 17" and in the diametrically opposed position.

Rotation of input shaft 10 by motor 20 (see FIG. 4) causes inner race 15 to rotate. Rotation of inner race 15 causes balls 14' and 14" to rotate without any slippage since they are held within the respective pockets 17' and 17" created between inner race 15 and outer race 16. In turn, rotation of balls 14' and 14" then causes outer race 16 to rotate, and consequently outer shaft 11, to which outer shaft 11 is coupled. The degree of rotation of outer race 16 is less than the degree of rotation of inner race 15, due to the different diameters of the two races. With reference to FIG. 4A, the greater the difference between outer contact diameter d of inner race 15 and inner contact diameter D of outer race 16, the greater the degree of speed reduction or increase. The respective sizes of inner and outer contact diameters D, d are based on where the inner and outer races 15, 16 contact balls 14' and 14".

A first finger assist 321' has a base member 323' and a projecting arm member 325' that are transverse to one another (e.g., orthogonal to one another). The base member 323' is positioned on the inner surface 3031 of the first section 301a of the housing 301 such that the projecting arm member 325' projects from the inner surface 3031 and contacts the first ball 14.' Projecting arm member 325' is positioned between the upper region of the interior surface of the outer race 16 and the upper region of the inner race 15.

Similarly, a second finger assist 321", which is in vertical registration with first finger assist 321', has a base member 323" and a projecting arm member 325" that are transverse to one another (e.g., orthogonal to one another). The base member 323" is positioned on the inner surface 3031 of the first section 301a of the housing 301 such that the projecting arm member 325" projects from the inner surface 3031 and contacts the second ball 14". Projecting arm member 325" is positioned between the lower region of the interior surface of the outer race 16 and the lower region of the inner race 15.

The projecting arm members 325' and 325" are positioned to project from the inner surface 3031 of the first section 301a of the housing 301 at spaced apart locations from one another. The motor input shaft 10 is supported by a shaft bearing support 101 positioned adjacent to the inner surface 3031 of the first section 301a of the housing 301. The shaft bearing support 101 is operably connected to the inner race 15. The shaft bearing support 101 defines a first lateral side 1011 and a second lateral side 1012. The first lateral side 1011 is positioned to face generally in the same direction as a first lateral side 301a1 of the first section 301a of the housing 301, as shown by arrows C1 and D1. The second lateral side 1012 is positioned to face generally in the same direction as a second lateral side 301a2 of the first section 301a of the housing 301, as shown by arrows C2 and D2.

According to the present disclosure, the projecting arm members 325' and 325" of the finger assists 321' and 321" are positioned unilaterally, e.g., on the same sides of the balls 14' and 14", respectively. The same sides of the balls 14' and 14" are those sides that generally coincide with the first lateral side 1011 of the shaft bearing support 101 and with the first lateral side 301a1 of the first section 301a of the housing 301.

Figure 4:
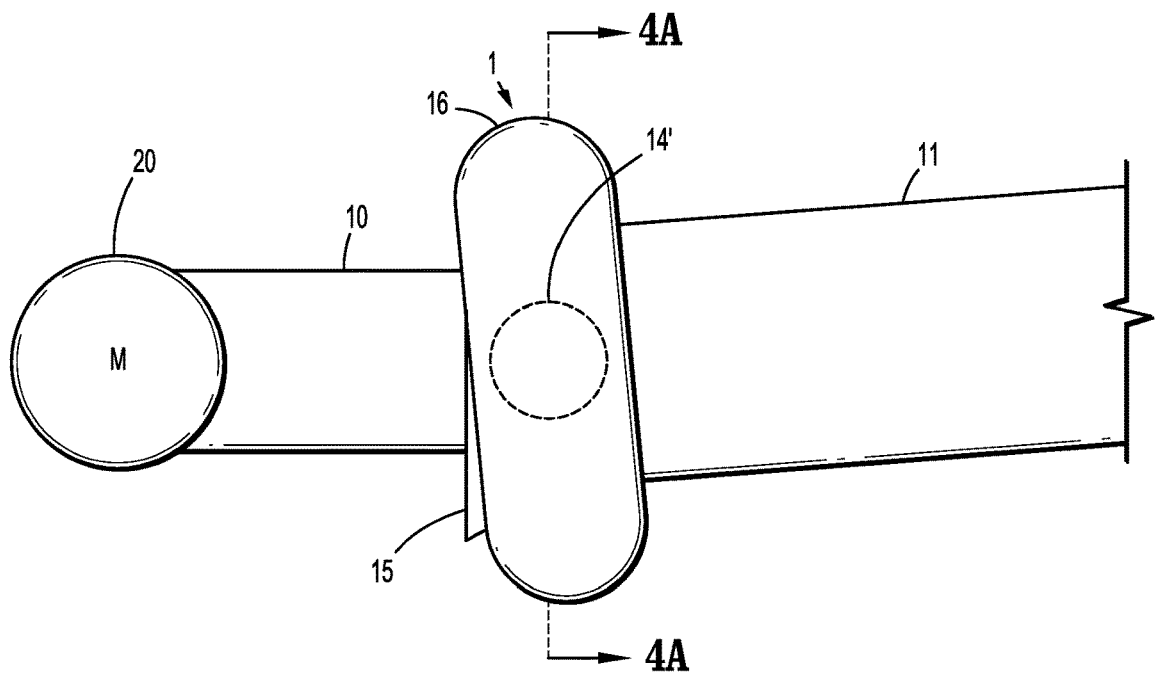
Figure 4A:
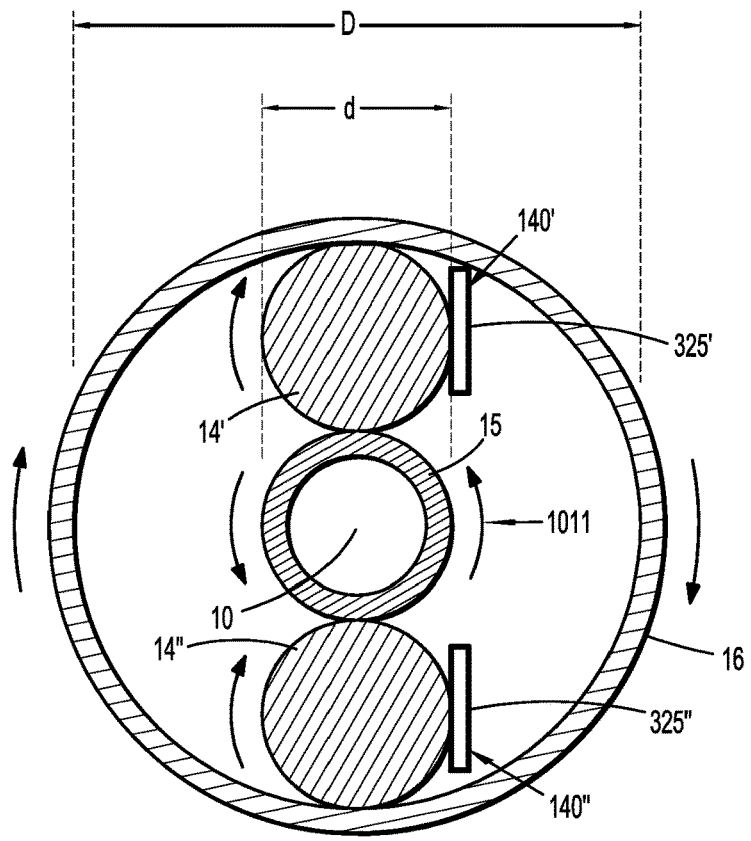

FIG. 4 shows a top view of the transmission arrangement 1, but for simplicity, the housing 301, which includes the first section 301a and the second section 301b, are omitted. The transmission arrangement 1 comprises the input shaft 10, which is connected to inner race 15, and output shaft 11, which is connected to outer race 16. Between the two races 15, 16 are the first and second balls 14' and 14" (shown in dotted lines in FIG. 4). Motor 20 is connected to input shaft 10. As described with respect to FIG. 1 relating to angles $\alpha 1$ and $\alpha 2$, inner race 15 is disposed angularly offset to outer race 16, so that balls 14' and 14" are held in pockets 17' and 17" between the races 15 and 16 with no play. As shown in FIG. 4A, which is a cross-sectional view along section line 4A-4A in FIG. 2, additional retention is provided by the projecting arm member 325' of first finger assist 321' for first ball 14' and by the projecting arm member 325" of second finger assist 321".

As a result, with the projecting arm members 325' and 325" of the finger assists 321' and 321" being positioned unilaterally allows the transmission arrangement 1 to operate in either the clockwise CW or counterclockwise CCW direction, depending on the direction of rotation of the motor shaft 10. The speed reduction of the output shaft 11 with respect to the input shaft 10 is the same in both the CCW and CW directions.

Figure 5:
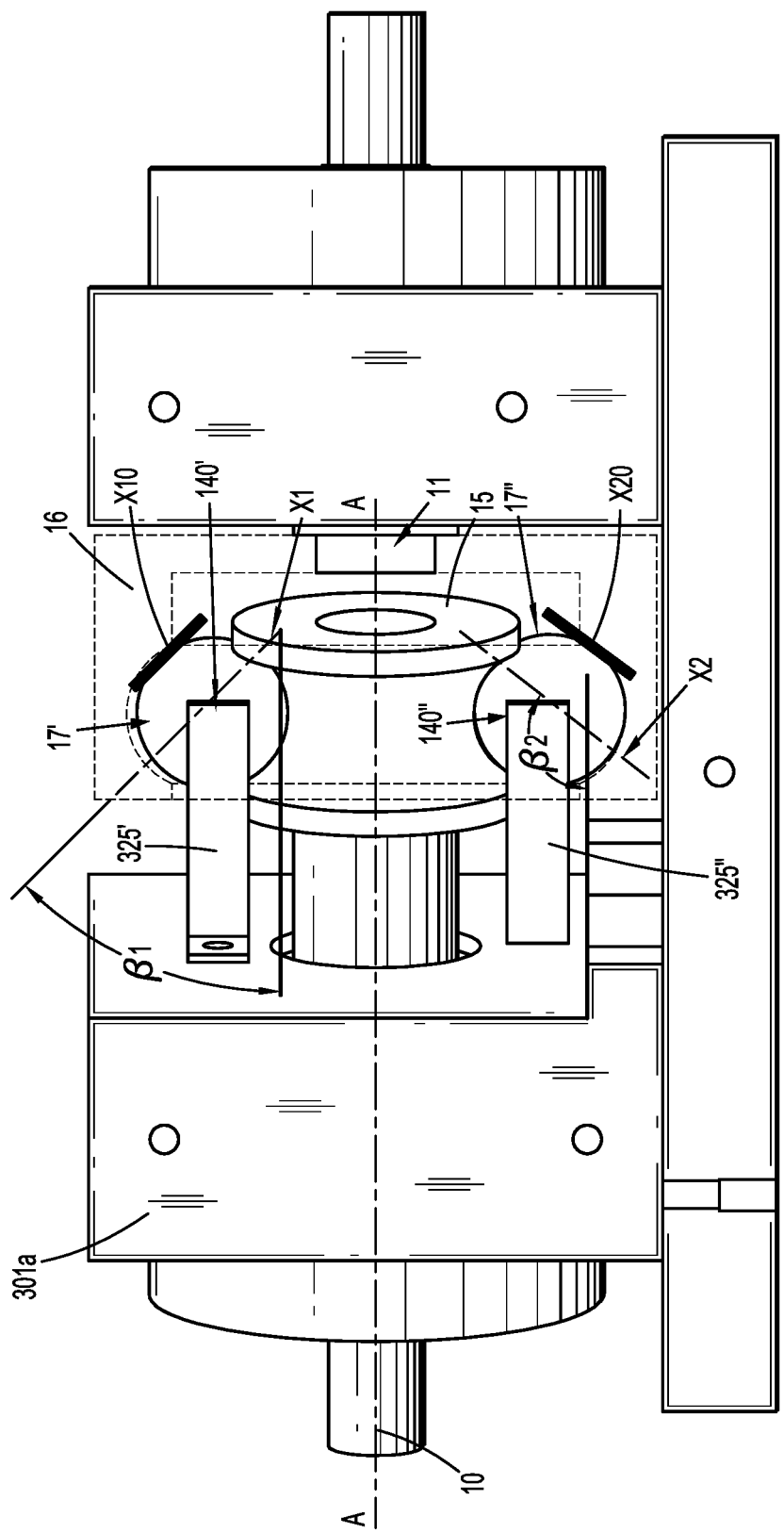

FIG. 5 is side or elevation view similar to FIG. 2 and which illustrates the balls 14' and 14" in contact with the projecting arm members 325' and 325" at contact points 140' and 140", respectively. Ball 14' rotates in contact with inner race 15 and outer race 16 such that the axis of rotation X1 of ball 14' is at an acute angle β1 with respect to the centerline axis A-A of motor shaft 10. Line X10 is an imaginary line that is parallel to the also imaginary axis of rotation X1 and both are intended to show the acute angle β1 during the initial operation of the races 15 and 16.

In contrast, during the initial operation of the races 15 and 16, ball 14" rotates in contact with inner race 15 and outer race 16 such that its axis of rotation X2 is at an obtuse angle β2 with respect to the centerline axis A-A of motor shaft 10. Similarly, line X20 is an imaginary line that is parallel to the also imaginary axis of rotation X2 and both are intended to show the obtuse angle β2 during the initial operation of the races 15 and 16.

Figure 6:
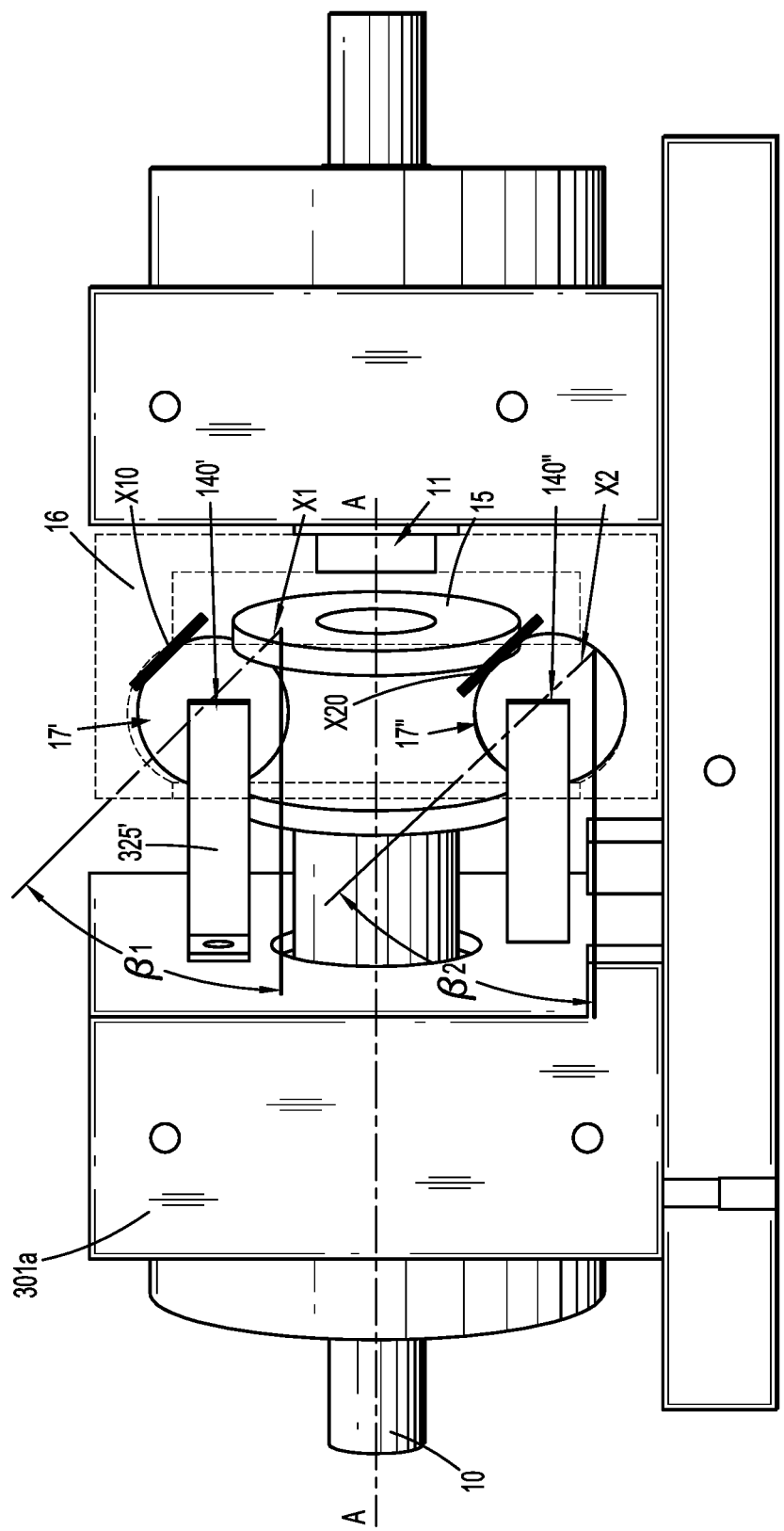

FIG. 6 is another side or elevation view similar to FIG. 5 which also illustrates the balls 14' and 14" in contact with the projecting arm members 325' and 325" at contact points 140' and 140", respectively, following the initial operation shown in FIG. 5. Ball 14' is illustrated rotating in contact with inner race 15 and outer race 16 such that its axis of rotation X1 is at the acute angle β1 with respect to the centerline axis A-A of motor shaft 10. Line X10 is again the imaginary line that is parallel to the also imaginary axis of rotation X1 and both are intended to show the acute angle β1 during the initial operation of the races 15 and 16.

However, in contrast to FIG. 5, as both balls 14' and 14" continue to operate and rotate, ball 14" rotates in contact with inner race 15 and outer race 16 such that the axis of rotation X2 of ball 14" is at acute angle β2 with respect to the centerline axis A-A of motor shaft 10 where acute angles β1 and β2 are equal. Again, line X20 is an imaginary line that is parallel to the also imaginary axis of rotation X2 and both are intended to show the acute angle β2 during the continuing operation of the races 15 and 16.

When projecting arm members 325' and 325" push balls 14' and 14" from the same direction, both balls 14' and 14" are pushed into the pockets 17' and 17", respectively, which, as indicated above, are the spaces between the outer surface of the inner race 15 and the inner surface of the outer race 16.

At first, one ball will engage, then, because of minor flexing (within the shafts 10, 11; housing 301; and transmission unit 1 as a whole), both balls 14' and 14" engage with the finger assists 321' and 321", respectively, allowing proper rotation of both balls 14' and 14". Since housing sections 301a and 301b are rigidly mounted and balls 14' and 14" remain in pockets 17' and 17" even without finger assists 321' and 321" (arm members 325' and 325") in position, finger assists 321' and 321" push the balls 14' and 14" in reaction to the balls 14' and 14" pushing up against the arm members 325' and 325" due to their direction of rotation since finger assists 321' and 321" themselves do not move significantly. By both finger assists 321' and 321" establishing contact points 140' and 140" on the same side of the balls 14' and 14", the finger assists 321' and 321" push unilaterally, e.g., from the same side of the balls 14' and 14", which allows for less strict manufacturing tolerancing. That is, the dimensions of the contact diameters d and D of the races 15 and 16, their shape and profile, and the accuracy of the angle α1 between the centerline of rotation of output shaft 11 with respect to the centerline of rotation of input shaft 10 need not be as precise as in prior designs because finger assists 321' and 321" push balls 14' and 14" into a proper position within pockets 17' and 17" despite less stringent dimensional tolerances in the effective formation of the pockets 17" and 17".

Having the transmission arrangement 1 capable of operating either in the CW or CCW direction, depending upon the direction of rotation of the motor shaft 10, significantly extends the suitability of applying the transmission arrangement 1 to more applications, enabling energy efficiency improvements in more applications as compared to the prior bilateral transmission arrangement.

While several embodiments or aspects of the disclosure have been shown in the drawings, it is not intended that the disclosure be limited thereto, as it is intended that the disclosure be as broad in scope as the art will allow and that the specification be read likewise. Any combination of the above embodiments or aspects is also envisioned and is within the scope of the appended claims. Therefore, the above description should not be construed as limiting, but merely as exemplifications of particular embodiments or aspects. Those skilled in the art will envision other modifications within the scope of the claims appended hereto.

What is claimed is:

1. A transmission arrangement comprising:
   an input shaft;
   an output shaft;
   an outer race mounted on one end of one of the input and output shafts;
   an inner race mounted on one end of the other of the input and output shafts, the inner and outer races being arranged to create a cage;
   ball bearings disposed within the cage and spaced apart from each other;
   a first finger assist mounted to press at least a first one of the ball bearings into position within the cage; and
   a second finger assist mounted to press at least a second one of the ball bearings into position within the cage, the second finger assist disposed in vertical alignment with the first finger assist.

2. The transmission arrangement of claim 1, wherein at least one of the first or second finger assists includes a metallic material.

3. The transmission arrangement of claim 1, wherein the ball bearings are prevented from sliding within the inner and outer races.

4. The transmission arrangement of claim 1, wherein the input shaft rotates at a first speed and the output shaft rotates at a second speed.

5. The transmission arrangement of claim 4, wherein rotation of the input shaft rotates the output shaft.

6. The transmission arrangement of claim 4, wherein the first and second speeds are different.

7. The transmission arrangement of claim 1, wherein the input shaft and the output shaft are rotatably mounted in a housing.

8. The transmission arrangement of claim 7, wherein the first and second finger assists are fixedly mounted to the housing.

9. The transmission arrangement of claim 1, wherein the input shaft defines a first lateral side and a second lateral side, the first and second finger assists disposed on the first lateral side of the input shaft.

10. The transmission arrangement of claim 9, wherein the first finger assist includes a first projecting arm member that contacts the first ball bearing on the first lateral side of the input shaft and the second finger assist includes a second projecting arm member that contacts the second ball bearing on the first lateral side of the input shaft.

11. The transmission arrangement of claim 1, wherein the inner race is disposed on the input shaft and the outer race is disposed on the output shaft.

12. The transmission arrangement of claim 1, wherein the outer race is disposed on the input shaft and the inner race is disposed on the output shaft.

13. The transmission arrangement of claim 1, further comprising a motor connected to the input shaft and positioned to rotate the input shaft relative to the output shaft.

14. The transmission arrangement of claim 1, wherein the first and second finger assists are disposed in vertical registration with one another.

15. The transmission arrangement of claim 1, wherein the inner and outer races are disposed at an angle with respect to one another.

* * * * *